United States Patent [19]

Delogne

[11] 4,152,648
[45] May 1, 1979

[54] RADIOCOMMUNICATION SYSTEM FOR CONFINED SPACES

[75] Inventor: Paul Delogne, Limelette, Belgium

[73] Assignee: Institut National des Industries Extractives, Liege, Belgium

[21] Appl. No.: 728,045

[22] Filed: Sep. 30, 1976

[30] Foreign Application Priority Data

Oct. 7, 1975 [BE] Belgium ............................. 645207

[51] Int. Cl.² .............................................. H04B 7/00
[52] U.S. Cl. .......................................... 325/26; 325/51; 333/237
[58] Field of Search ................. 333/84 L, 95 S, 97 R; 179/82; 325/51, 129, 130, 26, 28

[56] References Cited

U.S. PATENT DOCUMENTS

| 3,691,488 | 9/1972 | HoHum, Jr. ...................... 333/84 L |
| 3,735,293 | 5/1973 | Breitenbach ................ 333/84 L UX |
| 3,781,725 | 12/1973 | Yoshida et al. .................... 333/84 L |
| 3,947,834 | 3/1976 | Gershberg et al. ............ 333/84 L X |

OTHER PUBLICATIONS

DeKeyser et al., Radiocommunication and Control in Mines and Tunnels, Electronics Letters, 26 Nov. 1970, vol. 6, No. 24.

*Primary Examiner*—Paul L. Gensler
*Attorney, Agent, or Firm*—Martin A. Farber

[57] ABSTRACT

Radioelectric signals transmitted by a transmission line in the form of a sheathed cable having radiating sections whose length is chosen as a function of the wavelength in order to impart a directivity to their radial radiation or maximize the excitation of the monofilar mode in the downstream direction in relation to the transmitter.

11 Claims, 11 Drawing Figures

FIG.3  DISTANCE FROM TRANSMITTER

RADIOCOMMUNICATION SYSTEM FOR CONFINED SPACES

The present invention relates to a communication system particularly suitable for establishing radioelectric communication with mobile apparatus along an axis and in particular in tunnels.

The use of radioelectric transmission means in underground surroundings such as mines, quarries, public works and the like is a subject of ever increasing interest on account of the increase in productivity, safety and comfort which it provides. Similar technical problems are encountered and solved by using identical techniques when attempts are made to guide radioelectric waves along an axis above ground, generally a transport route, a roadway or railway line.

Various solutions to this type of problem are already available but none of them has the advantages which would enable them to satisfy all the situations encountered. From the point of view of wave propagation, a tunnel behaves like a hollow wave guide; its cutoff frequency varies from about 10 to 50 MHz, depending on the transverse dimensions of the gallery. Below this frequency, waves can no longer be propagated. Above this frequency, propagation is possible; its attenuation decreases with frequency and comes down to acceptable values at frequencies above some hundreds of MHz; at these frequencies, however, bends in the tunnel profile and obstacles that impede optical visibility are liable to cause a break down of communication.

Natural propagation is therefore possible only within a very short range. This natural propagation may be interpreted either in terms of the modes of wave guide which the tunnel constitutes or in terms of the plane waves reflected against its walls. Information on this subject may be found in bibliography references 1 and 2.

The properties of tunnels can be profoundly modified from an electromagnetic view by longitudinally suspending an insulated conductor therein. In addition to the wave guide modes, the existence of which is hardly affected by this conductor, there appears a new mode of propagation known as monofilar mode. This is the dominant mode of the type of coaxial cable formed by this conductor with the tunnel. This mode, in which the current flows along the insulated conductor and returns via the wall, has no cut off frequency and may therefore be used at any frequency. Its attenuation increases with the frequency at inverse ratio to the distance between the insulated conductor and the wall. This distance also influences the distribution of the lines of force in the transverse section of the tunnel. Bends or turns have practically no effect on this mode. As radio antennae situated in the tunnel are coupled to the lines of force, one could imagine that this mode would provide the solution to all the problems, particularly since a sufficiently low frequency could be used to reduce the attenuation to an acceptable value. However, this is not the case since one must take into account that the efficiency of portable antennae diminishes very rapidly with the frequency. The best compromise, obtained at frequencies of several MHz, provides communication over a range of the order of a kilometer. On the surface, such a mode could be guided along an axis by installing an insulated conductor, but suitable frequencies are rarely allocated to services which could benefit by this method. Technical information on the monofilar mode may be found in references 3 and 4.

These are reasons why more complicated technical solutions are often resorted to, in which a transmission line is suspended along the tunnel or transport route instead of a simple insulated conductor. This line may be either bifilar or coaxial. If coaxial, care must be taken to ensure that the external conductor has openings for the exchange of energy between the interior and exterior of the cable. The two wires of the bifilar line or the external conductor of the coaxial cable, as the case may be, play the role of an insulated conductor permitting the existence of a monofilar mode. The basic idea in all these systems is to arrange a transmission line which can transport the electromagnetic energy with much less attenuation than that of the modes of the tunnel while radiating a small portion intended for coupling with the antennae of the mobile apparatus. Depending on the particular case, the term "radiation" is used here to denote conversion of the energy transported by the transmission line into the monofilar mode or into wave guide modes or even, in the case of surface installations, into radiation in the classical sense of the term.

In the case of the bifilar line, it is known that radiation is due to asymmetries in the position of the line in relation to the wall (reference 5), and to the devices for supporting the line. The mechanism we are dealing with here is as random as its causes. This radiation may be controlled by arranging mode converters along the line at more or less regular intervals depending on the attenuation of the external modes. The fact remains, however, that bifilar lines are used very little on account of their sensitivity to external factors such as humidity.

Several types of coaxial cables are known in which the external conductor is interrupted by openings, for example by a longitudinal slit extending along the whole length of the cable or by numerous small apertures arranged very closely together. Coaxial cables with a loosely braided outer conductor are also used. Reference 6 describes such cables and systematic tests carried out on them. These cables are very similar to each other in their behaviour in spite of the different forms of apertures in them, but the reason why they radiate has only been partially explained. Studies carried out on this subject are for the most part purely experimental. It has been found that when the dimensions of the openings are increased in order to obtain more intense radiation, the attenuation of propagation increases and may even double under certain experimental conditions by comparison with that of a cable without apertures. This is a major disadvantage since it obviously reduces the range. A second defect, no less grave, is that along the length of the cable, the radiated field undergoes important variations which have the appearance of strongly random standing waves. It is therefore necessary to include in these calculations a safety margin of about 20 dB, which again reduces the range. Lastly, it has been found that the intensity of radiation as well as the attenuation in propagation inside the cable depend on the conditions of installation, which are liable to render the system unviable in the course of development or working of the tunnel. It is one of the objects of the present invention to obviate these disadvantages.

Another type of coaxial cable is known in which the conductor has slots arranged in the form of a helix or stairway. The reason for this arrangement is that the slots are required to interrupt the current of the external conductor at least in part in order to be energized and radiate. A longitudinal slot is in principle unable to radiate, in spite of the apparent contradiction between this statement and the description of the cables in the previous paragraph. The principles on which the cables described in the previous paragraph operate are radically different from those of the cable described here, and to avoid confusion the term "radiating cable" will hereinafter be reserved for the type of cables described in the previous paragraph. As will be seen from consulting reference 7, a cable with spiral or stairway slots cannot function correctly in accordance with its principle unless it has a frequency of several hundred MHz and the diameter of the cable is at least several centimeters. Such a cable is therefore structurally sound but very expensive and the present invention is not concerned with this type of cable.

Lastly, there is also known in the state of the art, a coaxial cable whose external conductor is an effective shield, radiation being in this case obtained by complete interruption of the external conductor provided with some circuit elements. This system is described in reference 3, for example. These radiating elements are interposed at more or less regular intervals, depending on the attenuation of waves on the outside of the cable. This system is able to provide a solution to numerous difficult problems. However, if the conditions of installation or the frequency are such that attenuation of the waves outside the cable is very great, it is necessary to use a large number of radiating elements, thereby increasing the cost and reducing the practicability of this arrangement. The present invention seeks to solve this problem by providing some synthesis between this system and radiating cables.

According to this invention, a coaxial cable is used, the external conductor of which may be a completely impervious sheath except at certain sections of predetermined lengths where the external conductor is of the same type as that of radiating cables, these sections being repeated at more or less regular intervals depending on the attenuation of the waves outside the cable. According to the invention, the length of these sections is calculated so as to reduce the standing waves outside the cable. According to one variation of the invention, a bifilar line may be used under a sheath which is removed over sections of predetermined length or modified over these sections so as to excite the monofilar mode.

The invention will now be explained in more detail with reference to the accompanying drawings which are provided by way of example, and not in a limiting sense, in which.

Figure 1:
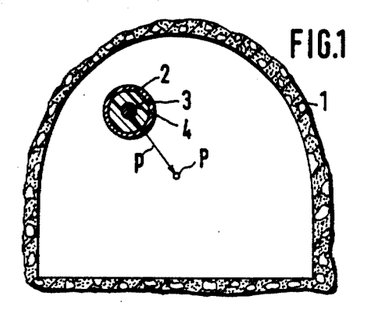
FIG. 1 is a schematic and idealistic representation of a transverse section of an tunnel in which a radiating cable is installed.

Referring now to the drawings, in order to fully understand the operation of a section of radiating cable 15 inserted in a non-radiating cable 16, it is necessary to provide a correct physical interpretation of the mode of operation of radiating cables in general. First there will be considered the case of a radiating cable situated in an tunnel and operating at a frequency lower than the cut off frequency thereof. FIG. 1 represents a transverse section through the tunnel 1 inside of which there is held a radiating cable consisting of an imperfectly shielding external conductor 2, a dielectric 3 having a dielectric constant $\epsilon$ and an internal conductor 4. The distance of an observation point P from the center of the conductor is denoted by $\rho$.

A first method of dealing with this problem is to apply the theory of coupled lines (reference 8). According to this theory, it is assumed that there are two modes of transmission coupled by the openings in the external conductor of the coaxial cable. The theory deals with modes of a transmission line in the sense that these modes are defined by voltages and currents and not by electromagnetic fields. The first mode, known as the coaxial mode, is defined by the current carried by the internal conductor and returning along the external conductor and by the voltage between these conductors. The second mode, referred to as the monofilar mode, is defined by the current carried by the wall of the tunnel and also returning along the external conductor of the cable and by the voltage between the wall and the external conductor. The coupling between these two modes is expressed in terms of a mutual inductance per unit length m and known as the transfer inductance of the external conductor. The reference 9 describes a classical method of measuring this parameter. According to this theory, the process of exchange between these two modes takes place along the whole length of the cable and these exchanges appear as pseudoperiodic. In the text which follows, these two modes will be referred to as improper since, being coupled, they cannot exist independently.

An alternative theory presented in reference 10 also makes use of these two modes but in this case they are defined by the electromagnetic fields. These modes are referred to as the coaxial eigenmode and the monofilar eigenmode to distinguish them from the ones mentioned above. They are not in fact coupled and their existence depends solely on the conditions at the two ends of the line. The coaxial eigenmode confines most of its energy between the internal conductor and the external conductor but it has leakage fields outside the cable. The monofilar eigenmode, on the other hand, confines most of its energy outside the cable but has leakage fields inside it. The result is that a generator connected to the cable or an antenna situated in the transverse section of the tunnel necessarily excites the two eigenmodes; these eigenmodes will be propagated in a totally independent manner so long as there is no discontinuity such as a change in position of the cable in the transverse section of the gallery or at the end of the cable.

It is clear from reference 10 that the theory of coupled lines and the theory of eigenmodes are equivalent, but that while the former lends itself well to calculation it does not provide a view of the fundamental physical phenomena given by the latter. The latter theory enables one to explain the mechanism of transmission between a transmitter connected to the coaxial cable and a mobile receiver in the tunnel and to draw from it conclusions which justify the present invention. Such a transmitter excites mainly the coaxial eigenmode but also the monofilar eigenmode although at a lower energy level. The distribution of fields of these modes is, however, very different on either side of the external conductor of the cable so that at a short distance from the transmitter, the leakage fields of the coaxial eigenmode and the main fields of the monofilar eigenmode practically may have the same orders of magnitude at a point situated in the section of the tunnel. Since these two modes have different phase velocities, namely approximately the velocity of light in the dielectric 3 of the cable and in air, respectively, it is observed that when point P is displaced parallel to the axis of the tunnel their relative phase varies and this yields standing waves. These were erroneously interpreted by the theory of coupled modes as alternating energy exchanges. If, however, the point of observation is moved away from the transmitter, the monofilar eigenmode becomes very rapidly attenuated since it causes a large current to circulate in the wall of the tunnel which is a poor conductor. The profile of standing waves is thus rapidly damped down and soon all that remains is the leakage fields of the coaxial eigenmode, which is much less attenuated. One may therefore conclude that when radiating cables are used at frequencies below the cut off frequency of the tunnel, they resort mainly to the coaxial eigenmode and to its leakage fields and make very little use of the monofilar eigenmode.

This results in one major disadvantage of radiating cables, namely the greater specific attenuation of the cable. In fact, an increase in the radiation of such a cable produced by increasing the dimensions of the apertures in the external conductor has the effect of increasing the leakage fields of the coaxial eigenmode. Since these leakage fields are necessarily accompanied by currents in the wall of the tunnel, the result is a greater attenuation of this mode.

Figure 2:
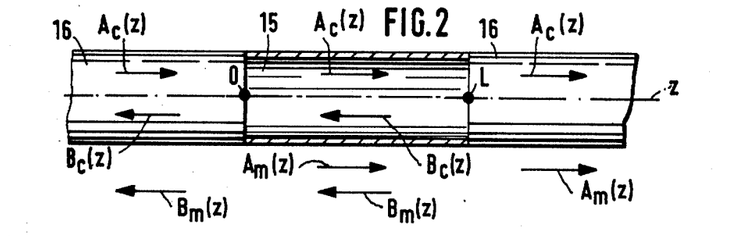
FIG. 2 shows the quantities used for studying the operation of a section of the radiating cable, particularly for calculating the monofilar mode.

According to the invention, this effect is avoided by making use of the monofilar mode propagated along the exterior of a coaxial cable provided with an effective sheath, and sections of radiating cable are used to excite this mode. The effect of inserting a radiating section 15 in a non-radiating coaxial cable 16 may be studied with reference to FIG. 2 in which the longitudinal coordinate is indicated by the reference z and the radiating section 15 is inserted between the abscissae z=0 and a=L. Let us assume that a signal generator is connected to the interior of the cable at z<0. The calculation for this structure may be carried out by using the improper modes and applying to them the theory of coupled lines of 0<z<L. The results of the calculation are expressed in terms of waves (of which the square of the modulus expresses the power) of improper monofilar and coaxial modes. Waves propagated towards positive values of z are indicated as $A_c(z)$ and $A_m(z)$ and those propagated towards negative values of z are indicated as $B_c(z)$ and $B_m(z)$. The generator produces the wave $A_c(0)$ which is taken as equal to 1. The following symbols are also used:

$l_c$, $l_m$: specific inductances of the two modes.
$\gamma_c$, $\gamma_m$: propagation constants of the two modes.
$\beta_c$, $\beta_m$: phase constants of the two modes.
m: transfer inductance of the external conductor in the radiating section 15.
$\epsilon$: dielectric constant of the insulator 3 of the cable.
Two coupling coefficients are defined as follows:

$$C_1 = \frac{m}{2\sqrt{l_m l_c}} \frac{1}{\epsilon^{\frac{1}{2}} - \epsilon^{-\frac{1}{2}}} \quad (1)$$

$$C_2 = \frac{m}{2\sqrt{l_m l_c}} \frac{1}{\epsilon^{\frac{1}{2}} + \epsilon^{-\frac{1}{2}}} \quad (2)$$

Calculation shows that the progressive and regressive monofilar modes along the section at leakage, that is to say for 0<z<L, may be expressed as follows:

$$A_m(z) = C_1[e^{-\gamma_c z} - e^{-\gamma_m z}] \quad (3)$$

$$B_m(z) = C_2[e^{-\gamma_c z} - e^{-\gamma_c L - \gamma_m(L-z)}] \quad (4)$$

In order to see the meaning of the coupling coefficients $C_1$ and $C_2$ one may first consider the use of the continuous radiating cables according to the state of the art. The length L is then very large and may be considered infinite. Equations (3) and (4) yield:

$$A_m(z) = C_1(e^{-\gamma_c z} - e^{-\gamma_m z}) \quad (3')$$

$$B_m(z) = C_2 e^{-\gamma_c z} \quad (4')$$

One has to remember that these expressions describe the improper monofilar mode; they are thus directly proportional to the electromagnetic field in the tunnel space which is due to the superposition of the leakage field of the coaxial eigenmode and of the principal field of the monofilar eigenmode. The exponentials in (3) and (4') enable one to distinguish these two contributions. It is seen that the leakage field of the coaxial eigenmode is excited at the origin of the radiating cable with an amplitude $(C_1+C_2)$ and that the principal field of the monofilar eigenmode is excited with an amplitude $C_1$. Given that $C_2$ is much smaller than $C_1$, as will be seen further on, these two types of field are excited at substantially equal levels at the origin of a continuous radiating cable, as has been indicated previously.

Coming back to the case of a radiating section 15 of short length, the attenuation of the two modes along the section can be neglected and (3) and (4) may be written as follows:

$$A_m(z) = C_1 e^{-j\beta_c z}[1 - e^{-j(\beta_m - \beta_c)z}] \quad (5)$$

$$B_m(z) = C_2 e^{-j\beta_c z}[1 - e^{-j(\beta_m + \beta_c)(L-z)}] \quad (6)$$

It should be understood that the monofilar wave excited along the cable to the right of the radiating section 15 (z>L) is given by the equation $$A_m(z) = A_m(L) e^{-\gamma_m(z-L)} \quad (7)$$

since it is no longer coupled to the coaxial mode. Similarly, the monofilar wave excited to the left of the radiating section 15 (z<0) is given by the equation:

$$B_m(z) = B_m(0) e^{\gamma_m z} \quad (8)$$

Ignoring the phases, the net result of this study is that a radiating section 15 excites to the right a monofilar wave of an amplitude given by the equation $$A_m = 2C_1 \sin(\beta_m - \beta_c) L/2 \quad (9)$$

and to the left a monofilar wave of amplitude given by the equation $$B_m = 2C_2 \sin(\beta_m + \beta_c)L/2 \quad (10)$$

A look at equations (1) and (2) shows that the coefficient $C_1$ may become much larger than $C_2$ if care is taken to use a cable whose insulator has a low dielectric constant. The radiating section 15 then functions as a directional coupler which excites the monofilar mode mainly in a direction downstream of the transmitter. This property is important because it makes it possible to ensure that two radiating sections inserted in the cable at a certain distance from each other will not send towards each other monofilar waves of nearly equal amplitudes, which would produce standing waves whose presence would make it necessary to provide a margin of some 20 dB in the calculation. It is also necessary to ensure that the sine factors appearing in formulae (9) and (10) will not reduce this directional effect. For this purpose, the length L must be chosen as a function of the operating frequency in order to obtain the relationship:

$$(\beta_c - \beta_m)L/2 = \pi/2 \quad (11)$$

In practice, the length L is given as a function of the wavelength in free space $\lambda_o$ by:

$$L = \lambda_o / 2(\sqrt{\epsilon - 1}) \quad (12)$$

It can be seen tht the 3dB bandwidth of this directional coupling extends from $f_o/2$ to $3f_o/2$, where $f_o$ is the design frequency for which (12) is valid.

Under these conditions, the amplitude of the monofilar wave excited downstream of the radiating section is given by:

$$A_m = 20_1 = \frac{m}{\sqrt{l_m l_c}} \frac{1}{\epsilon^{\frac{1}{4}} - \epsilon^{-\frac{1}{4}}} \quad (13)$$

that is to say at 6 dB above the level which leakage fields of the coaxial eignmode would have when excited at the beginning of a conventional continuously radiating cable. The loss due to insertion of a radiating section 15 in a normal cable for propagation inside it is given by:

$$p = 10 \log(1 - 4C_1^2 - 4C_2^2) \text{ (dB)} \quad (14)$$

This is virtually negligible. It should be understood that the theory explained above for the use of such a system in an tunnel is also valid for use of the monofilar mode when such a system is placed along an axis aboveground, for example along a roadway.

Figure 3:
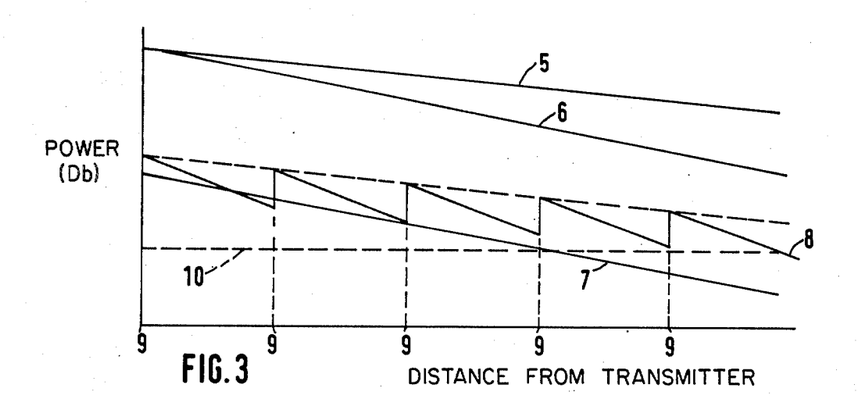
FIG. 3 shows the quantities used for calculation of the range of a communication system using radiating sections.

FIG. 3 explains why and in what circumstances a non-radiating cable 16 provided with radiating sections 15 according to this invention may be advantageous compared with a cable radiating along its whole length according to the prior art. The FIG. 3 represents graphically the powers, in logarithmic units, as a function of the distance from the transmitter. The straight line 5 represents the level of power inside the non-radiating cable 16. The line 6 represents the level of power inside a cable which radiates along its whole length. The line 7 represents the level of power of the leakage field of the coaxial mode of a cable radiating along its whole length. The saw-tooth line 8 represents the level of power of the monofilar mode propagated along a non-radiating cable 16 provided with radiating sections 15 according to the invention situated at points 9. This figure takes into account that a cable which radiates along its whole length suffers greater attenuation than a non-radiating cable. If the minimum level necessary for reception by the mobile apparatus is lower than that of the straight line 10, the system according to the invention provides a greater range than a radiating cable according to the known art. Realization of this condition depends on the specific characteristics of a given case.

The theory given above is valid when the cable is used at a frequency below the cut off frequency of the tunnel. Above this frequency, the use of radiating sections 15 according to the invention gives rise to complex phenomena due to the large number of waveguide modes which it is liable to propagate. It nevertheless remains of interest, as will be seen below.

To simplify the situation, one may start by imagining that the cable is held in free space. In this theoretical situation, a continuous radiating cable of infinite length can support two guided waves both of which have the character of a surface wave.

The first one is the classical coaxial mode accompanied by leakage fields. Its phase velocity is little affected by the leakage. The second one is a Goubau wave which has leakage fields inside the cable but confines most of its energy outside the cable. Its phase velocity depends mainly on the plastic jacket which may cover the outer surface of the cable. It is known that if the phase constant of such guided waves is h, the waves outside the cable comprise cylindrical harmonics which depend on the distance $\rho$ from the axis of the cable according to modified Bessel functions of the second type $K_m(u\rho)$ where u is defined by:

$$u = \sqrt{h^2 - k_o^2}; \quad k_o = 2\pi/\lambda_o \quad (15)$$

where $\lambda_o$ is the wavelength in air. It is also known that these functions behave as $$\sqrt{1/u\rho} \, e^{-u\rho}$$

where $\rho$ tends to infinity. Such a guided wave therefore has fields theoretically extending to infinity, but for the most part the fields are concentrated inside a cylinder of a radius given by the equation:

$$\rho e = 1/u = \lambda_o / 2\pi \, (1/\sqrt{(h/k_o)^2 - 1}) \quad (16)$$

known as the effective radius of the wave.

For the coaxial mode, the ratio $(h/k_o)^2$ is approximately equal to the dielectric constant $\epsilon$ of the internal insulator of the cable, and the effective radius of the wave is a small fraction of the wavelength. For the Goubau mode, the external plastic jackets of conventional coaxial cables are such that this ratio may be of the order of 1.01 within VHF and UHF frequency bands. The effective radius of the wave therefore amounts to several wavelengths. At 450 MHz, for example, these radii may be 15 cm and 15 m respectively. It should be added here that a cable of this type does not radiate waves travelling in a radial direction unless discontinuities are introduced, the waves then emanating from these discontinuities. The beginning and end of the cable themselves constitute radiating discontinuities.

The next phase of the argument consists of placing such a radiating cable in a tunnel. At frequencies below 1 GHz at which such systems are used, the effective radius of the wave of the Goubau wave is always greater than the transverse dimensions of the tunnel. In fact, as can easily be imagined, this wave is then the monofilar mode considered above. However, its attenuation of propagation produced by the wall is extremely great due to the high frequency. The same is true of the radial radiation from the discontinuities formed by the beginning and end of the cable. All that now remains to be considered is the coaxial mode. If the distance between the point at which the cable is suspended and the wall is greater than the effective radius of the coaxial mode, the wall has practically no influence on the latter. However, it should be added that a receiver situated outside the effective radius will only receive an extremely weak signal. This explains the experimental finding that a so-called radiating cable no longer appears to radiate at 450 MHz when suspended more than 20 cm away from the wall. If, on the other hand, the distance between the cable and the wall is reduced to below the effective radius of the coaxial mode, the various irregularities in the wall constitute as many discontinuities giving rise to radial radiation. It is under these conditions that a radiating cable truly merits its name. Even when the cable is suspended far from the wall, the suspensions of the cable may produce the same effect.

It is clear that this diffraction of the leakage field of the coaxial mode by the irregularities of the wall has a very low efficiency. The more one wishes to increase the effect by bringing the cable closer to the wall or by increasing the size of the openings in the external conductor, the more energy does the wall absorb. The strong interaction which is therefore required between the wall and the fields of the coaxial mode is the fundamental reason why the attenuation of the cable greatly increases when the cable is placed under conditions of radiation. The second major disadvantage of the radiating cables known in the art is the presence of numerous sources of radiation producing standing waves with deep nulls.

According to the invention, these disadvantageous effects are reduced by using a coaxial cable which may have an effectively shielding external conductor except over predetermined sections of length. When the cable is placed in an tunnel and used well above the cut off frequency of the tunnel, the monofilar mode is certainly still excited, but since its attenuation is very great at high frequencies, it can no longer be taken into account for practical purposes. It is the radial radiation of the radiating section 15 which will be used for obtaining communications with the mobile apparatus. It should be noted that this radiation is subject to reflections against the walls, and the total field may be interpreted in terms of wave guide modes. However, it is more useful in practice to consider that each radiating section 15 is an antenna the radiation of which undergoes reflections on the tunnel walls. This way the problem reduces to the study of the radiation of a radiating section 15 inserted in a cable 16 of infinite length assumed to be in free space. Only the results of this study will be given here. The cable is represented schematically in FIG. 4. The fields show a rotational symmetry. Their minute structure in the immediate vicinity of the radiating section will be ignored here. The field radiated at a great distance R in a direction defined by the angle $\theta$ has a linear polarization along the vector $u_\theta$. Using the following notations:

f: operating frequency
2a: diameter of cable
I: intensity of current carried by the core of the coaxial cable
$h_g$: phase constant of the Goubau wave capable of propagated outside the cable
$u_g$: variable defined by (15) for Goubau wave
C: a constant defined by $$C = u_g a K_0(u_g a)/K_1(u_g a) \qquad (17)$$

wherein the functions K are modified Bessel functions of the second type
$h_c \simeq k_o \sqrt{\epsilon}$: phase constant of coaxial mode.
H: Hankel function It can be shown tht the field radiated at a great distance by the radiating section of cable 15 has the value:

$$E_\theta = (2fmk_oaIL) \frac{1}{k_oa\sin\theta H_o^{(2)}(k_oa\sin\theta) + CH_1^{(2)}(k_oa\sin\theta)} \frac{\sin[(h_c - k_o\cos\theta)L/2]}{(h_c - k_o\cos\theta)L/2} \qquad (18)$$

Figure 4:
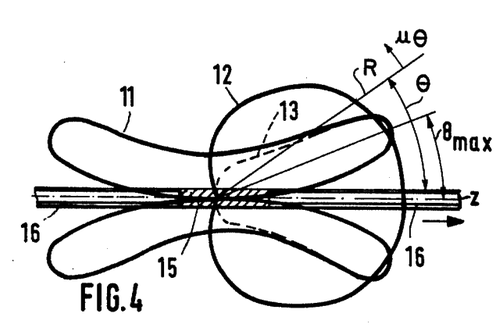
FIG. 4 illustrates a radiating section inserted in a non-radiating cable with the radiation patterns.

The radiation pattern has rotational symmetry results from the last two factors of expression (18). The first of these two factors depends on the parameters of the Goubau wave obtained by means of the factor C, but the numerical calculations made show that for a wide variety of external plastic sheets of coaxial cables and for frequencies of between 30 and 500 MHz, there is very little variation in the resulting radiation patterns. This factor always gives rise to radiation patterns of the type represented by curve 11 with maximum radiation angles $\theta_{max}$ of between 7° and 10°. With suitable choice of the length L, the last factor of equation (18) has a radiation pattern having approximately the form of a cardioid, as shown by curve 12. The product of the two factors yields a global radiation pattern which has the form shown by curve 13. This way, the back lobes of the radiation pattern are suppressed and radiation is maximized downstream with respect to the transmitter; this directive effect is obtained by choosing a value of L such that $(h_c - k_o)L/2$ is close to $\pi$. However, other values for L may be used for obtaining other directive effects. A closer examination of equation (18) will show that it is advantageous to have a small value for the dielectric constant $\epsilon$ of the internal insulator of the cable.

The directive effect described above ensures that the radiating sections 15 inserted in a cable according to the invention will not radiate towards each other, and reduces the standing waves in the gallery. This is an important advantage over the radiating cables known in the art. Moreover, radiation takes place without useless waste since it results from a desired and controlled effect and is not due to the presence of a wall. It is also for this reason that the system according to the invention is equally suitable for applications above ground.

Figure 6:
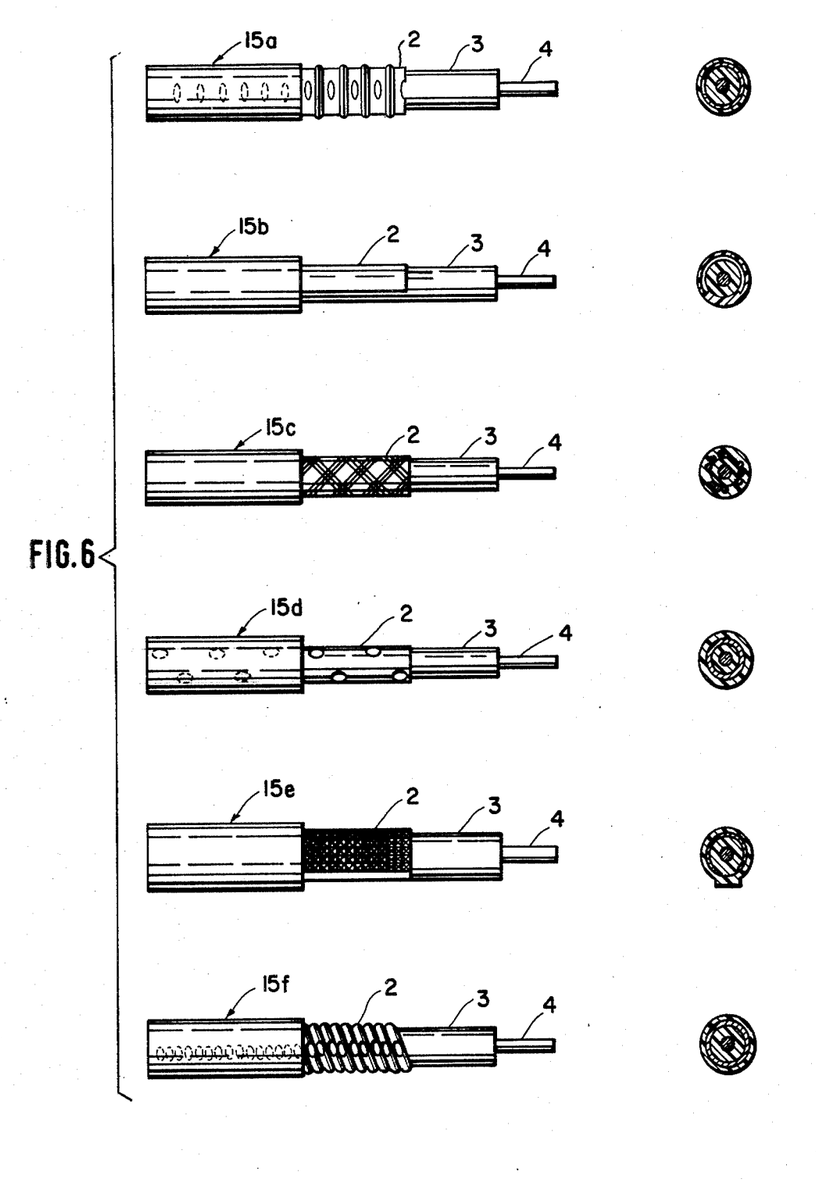
FIG. 6 shows various radiating cables in plan view for the realization of the radiating sections.
Figures 7A, 7B:
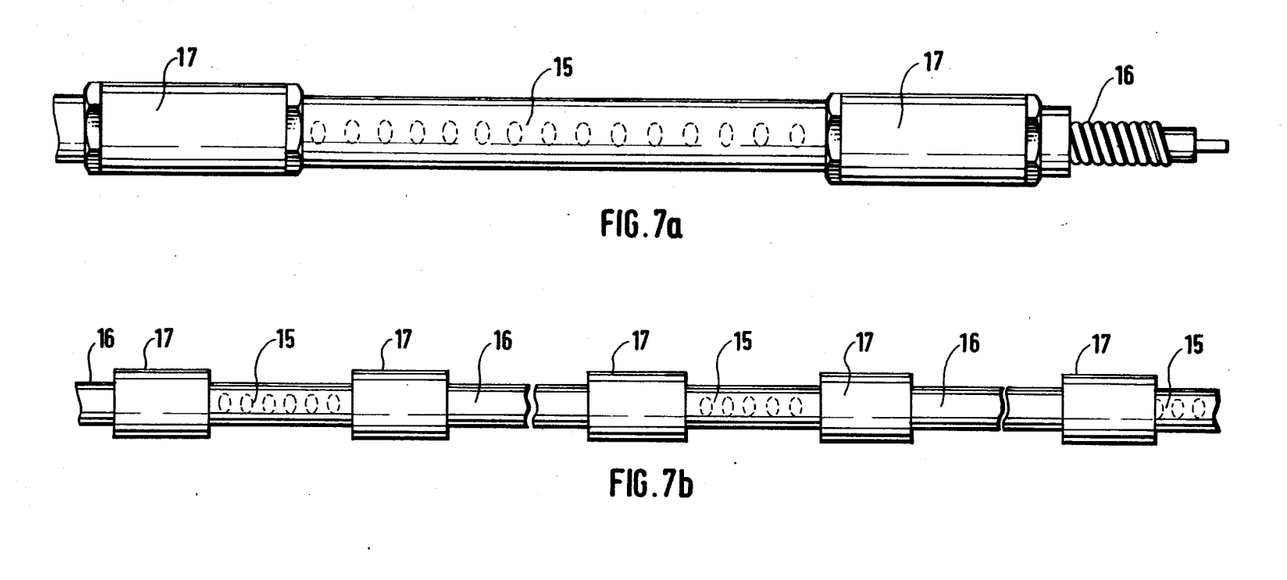
FIGS. 7a and 7b show radiating sections inserted in a non-radiating cable.
Figure 8:
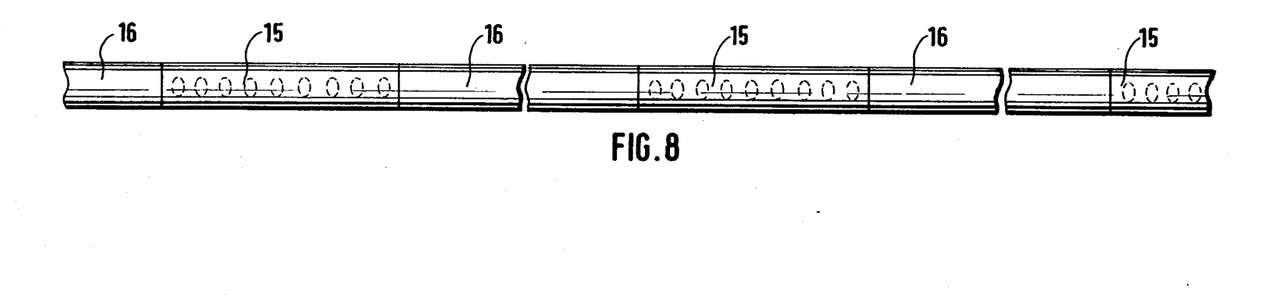
FIG. 8 shows incorporation of the radiating sections in the stage of the manufacture of the cable.

The realization of the invention in practice may take various forms. Any type of radiating cable (FIG. 6) may be used for the radiating sections 15, bearing in mind that in order to avoid excessive energy loss the radiating sections 15 should preferably have the same characteristic impedance as the non-radiating cable 16. As shown in FIG. 6, the radiating sections can consist of a coaxial cable 15a by which an external pleated-surfaced conductor is pierced with holes, or a cable 15b in which the external conductor covers only one-part of the periphery and thus has a longitudinal slat, or a cable 15c in which the external conductor is a loosely weaved braid or a cable 15d in which the external conductor is a smooth cylinder pierced with holes, or a cable 15e in which the exterior corrugated or waffle-type conductor possesses a longitudinal split, or a cable 15f in which the ringed or annular external conductor has been milled to create holes. The radiating sections 15 can be inserted in a non-radiating cable 16 by means of connectors 17 (FIGS. 7a and 7b). In order to improve the reliability one may prefer to avoid the use of connectors; this can be obtained by forming the holes on the required lengths 15 at a suitable stage of manufacturing the coaxial cable 16, as suggested by FIG. 8.

The principle of the invention has been described up to now only for coaxial cables but it is equally valid for a cable consisting of a bifilar line under a sheath.

Figure 5A:
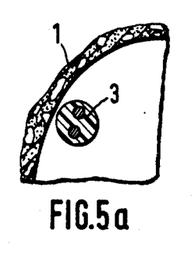
FIGS. 5a, 5b, 5c show a section of bifilar line under a sheath producing the appearance of the monofilar mode.
Figure 5B:
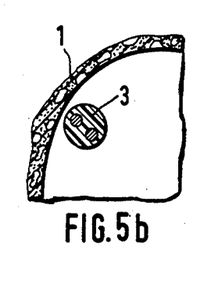
Figure 5C:
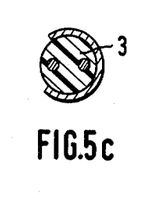

FIG. 5 shows two such embodiments but they should not be considered limiting. In FIGS. 5a and 5b, the radiating section is formed by completely removing the sheath. By placing the line asymmetrically with respect to the wall as shown in FIG. 5b, excitation of the monofilar mode is obtained on the radiating section. Indeed since the two wires occupy asymmetric positions in relation to the wall, the mode of transmission in which they transport opposite currents is an improper mode. If, by contrast, a symmetrical position is adopted as in FIG. 5a, the mode is an eigenmode and the monofilar mode will not be excited. FIG. 5c represents a transverse section through another possible embodiment of a radiating section obtained by removing the sheath over a part of the periphery of the cable so that the remaining part of the sheath 14 produces an asymmetry. Here again, the resulting mode in which the two wires of the line carry opposite currents is improper, thus giving rise to the monofilar mode. Other arrangements producing an asymmetry between the two wires of the line can easily be envisaged, without thereby departing from the scope of the invention.

REFERENCES

1. A. G. Emslie, R. L. Lagace & P. F. Strong, "Theory of the propagation of UHF radio waves in coal mine tunnels", Proc. Through-the-Earth Electromagnetics Workshop, Colorado School of Mines, Golden, Colo., Aug 15–17, 1973, available from Nat. Tech. Inform. Service, Alexandria Va., USA.
2. S. F. Mahmoud & J. R. Wait, "Geometrical optical approach for electromagnetic wave propagation in rectangular mine tunnels", Radio Science, USA, vol. 9, No. 12, pp. 1147–1158, 1974.
3. P. Delogne, "Les télécommunications par radio en milieu souterrain", Revue HF, Belg., vol. IX, No. 2, pp. 18–26, 1973.
4. J. R. Wait & D. A. Hill, "Guided electromagnetic waves along an axial conductor in a circular tunnel", IEEE Trans., USA, vol. AP-22, No. 4, pp. 627–630, 1974.
5. L. Deryck, "Control of mode conversion on bifilar line in tunnels", The Radio and Electronic Eng., UK, vol. 45, No. 5 pp. 241–247, 1975.
6. D. J. Cree & L. J. Giles, "Practical performance of radiating cables", id. pp 215–223.
7. K. Mikoshiba & Y. Nurita, "Guided radiation by coaxial cable for train wireless systems in tunnels", IEEE Trans., USA, vol. VT-18, pp. 66–69, 1969.
8. J. Fontaine, B. Demoulin, P. Degauque & R. Gabillard, "Feasibility of a radiocommunication in mine galleries by means of a coaxial cable having a high coupling impedance". Proc. Through-the-Earth Electromagnetics Workshop, Colorado School of Mines, Golden, Colo., Aug 15–17, 1973, available from Nat. Tech. Inform. Service, Alexandria, Va., USA.
9. L. Krügel, "Abschirmwirkung von Aussenleitern Flexibler Koaxialkabel", Telefunken-Z, Germ., vol. 29, p. 114, 1956.
10. P. Delogne, "Electromagnetic theory of the leaky coaxial cable", The Radio and Electronic Eng., UK, vol. 45, No. 5, pp. 233–240, 1975.

I claim:

1. A communication system particularly suitable for establishing radioelectric communication with mobile transmitters and receivers and between them in tunnels comprising
    a transmission line means located inside a tunnel for transmitting radioelectric signals comprising a sheathed cable having at least one inner conductor surrounded by an insulator and having first predetermined length radiating sections longitudinally alternating with second predetermined length non-radiating sections,
    a transmitter applied to said sheathed cable and cooperating with a receiver for establishing radioelectric communication,
    each first predetermined length of radiating section being a function of the operating frequency according to $$L = \lambda_0 / 2(\sqrt{\epsilon} - 1)$$

wherein
    L is the length of a radiating section,
    $\epsilon$ is the dielectric constant of the insulator,
    $\lambda_o$ is the wave length in free space,
in order to impart a directivity to radial radiation therefrom and maximize the excitation of the monofilar mode in the downstream direction in relation to said transmitter connected to the transmission line,
    said second predetermined length of non-radiating sections being a function of the attenuation of the radio waves outside of said transmission line means, said radio wave being either the monofilar mode or the waveguide mode, according to the frequency range.

2. The communication system according to claim 1, wherein
    said transmission line means is a coaxial cable having an external conductor,
    said external conductor is formed with a continuous opening means over the whole length of the section in said external conductor of said cable for providing said radiating sections.

3. The communication system according to claim 1, wherein
    said transmission line means is a coaxial cable having an external conductor,
    said external conductor is formed with a plurality of openings means very close together acting as a continuous opening for providing said radiating sections.

4. The communication system according to claim 1, wherein said transmission line means includes a bifilar line having two wires, and a sheath disposed over said transmission line means, said radiating sections include partially removed portions of said sheath asymmetrically oriented in relation to said two wires in said transmission line means.

5. The communication system, according to claim 1, wherein said insulator has a small dielectric constant.

6. The communication system according to claim 1, wherein said transmission line means includes a bifilar line having two wires, and a sheath disposed over said transmission line means, said two wires in said transmission line means are oriented in asymmetrical positions with respect to a wall of said tunnel in which said transmission line means is disposed, and said radiating sections include completely removed portions of said sheath.

7. The communication system according to claim 1, wherein the length of said radiating sections is many times smaller than that of said non-radiating sections.

8. The communication system according to claim 1, wherein said transmission line means is a coaxial cable which includes an external conductor, each said radiating sections is formed by at least one partial discontinuity in a portion of said external conductor, said portion disposed about each said radiating sections.

9. The communication system according to claim 8, wherein said at least one partial discontinuity in said portion of said external conductor about each said radiating sections is formed as a continuous longitudinal slot.

10. The communication system according to claim 8, wherein said at least one partial discontinuity in said portion of said external conductor about each said radiating sections is formed as a plurality of holes.

11. The communication system according to claim 8, wherein said external conductor is a loosely weaved braided conductor.

* * * * *